SELECTIVELY PROGRAMMED PERFORATING APPARATUS
Filed Oct. 9, 1953 7 Sheets-Sheet 1
FIG. 1, FIG. 2
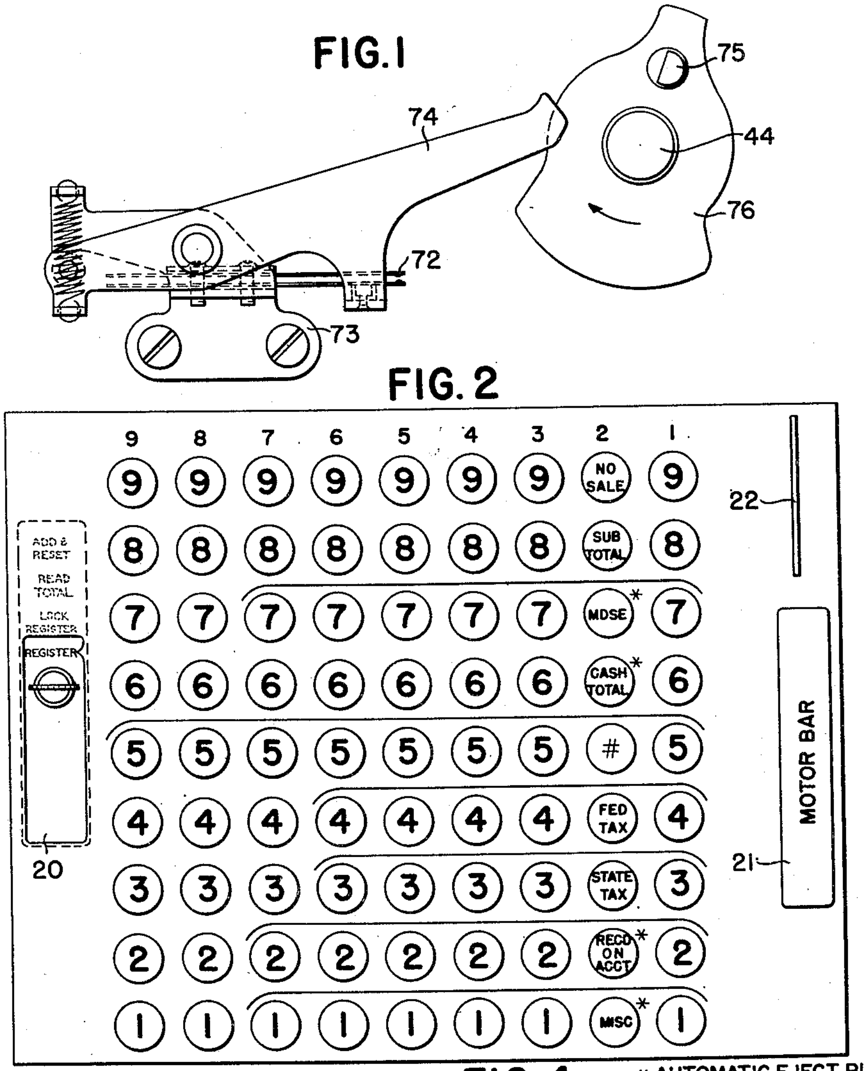
* AUTOMATIC EJECT PUNCH
FIG. 3
| TRANS. | PUNCHING SEQUENCE BANK NUMBERS | | | | | | | | | EJECT |
|---|---|---|---|---|---|---|---|---|---|---|
| NO SALE | | | | NONE | | | | | | |
| SUB TOTAL | | | | NONE | | | | | | |
| MDSE. | 2 | 7 | 6 | 5 | 4 | 3 | 1 | | | X |
| CASH TOTAL | | | | NONE | | | | | | X |
| # | 2 | 9 | 8 | 7 | 6 | 5 | 4 | 3 | 1 | |
| FED. TAX | 2 | 6 | 5 | 4 | 3 | 1 | | | | |
| STATE TAX | 2 | 6 | 5 | 4 | 3 | 1 | | | | |
| RECD. ON ACCT | 2 | 7 | 6 | 5 | 4 | 3 | 1 | | | X |
| MISC. | 2 | 7 | 6 | 5 | 4 | 3 | 1 | | | X |
FIG. 4
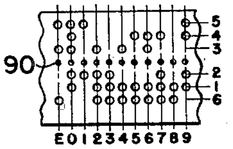
INVENTORS
LAWRENCE D. KILHEFFER
JAMES L. HAGEMEYER
BY Earl Beust
Louis A Kline
THEIR ATTORNEYS FIG. 5
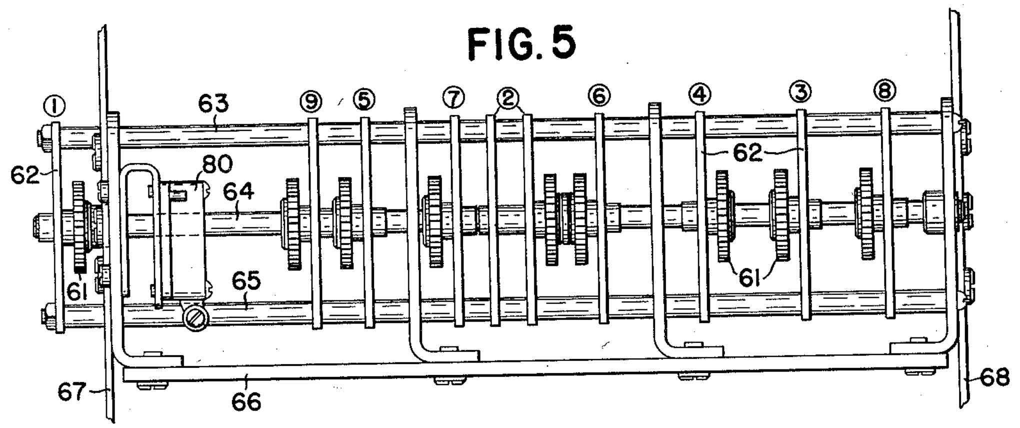
FIG. 6 FIG. 7 FIG. 8
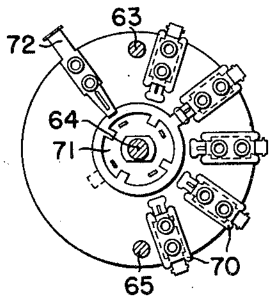
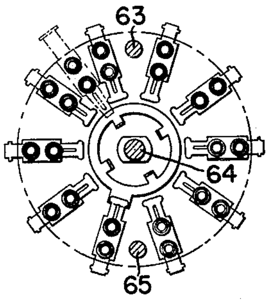
FIG. 9
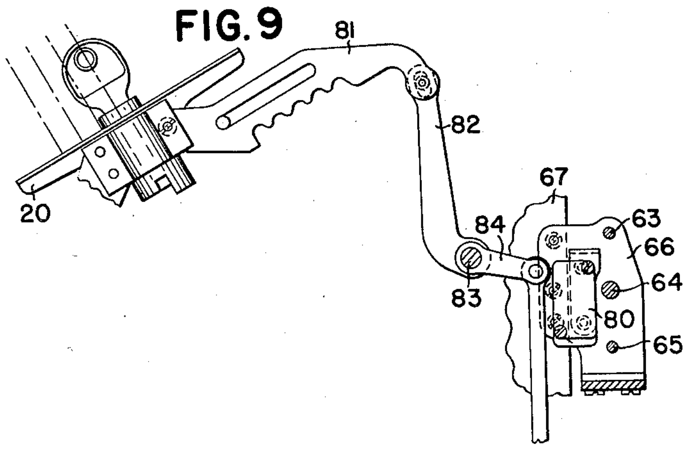
INVENTORS
LAWRENCE D. KILHEFFER
JAMES L. HAGEMEYER
BY Earl Bennett
Louis A Kline
THEIR ATTORNEYS Feb. 19, 1957 L. D. KILHEFFER ET AL 2,781,847

SELECTIVELY PROGRAMMED PERFORATING APPARATUS

Filed Oct. 9, 1953 7 Sheets-Sheet 3

INVENTORS
LAWRENCE D. KILHEFFER
JAMES L. HAGEMEYER

BY Carl Beust

Louis A. Kline

THEIR ATTORNEYS

SELECTIVELY PROGRAMMED PERFORATING APPARATUS

Filed Oct. 9, 1953 7 Sheets-Sheet 4

INVENTORS
LAWRENCE D. KILHEFFER
JAMES L. HAGEMEYER
BY [signature]
[signature]
THEIR ATTORNEYS

SELECTIVELY PROGRAMMED PERFORATING APPARATUS

Filed Oct. 9, 1953 7 Sheets-Sheet 5

INVENTORS
LAWRENCE D. KILHEFFER
JAMES L. HAGEMEYER
BY Earl Beust
Louis A Kline
THEIR ATTORNEYS INVENTORS
LAWRENCE D. KILHEFFER
JAMES L. HAGEMEYER
BY Earl Beust
Louis A. Kline
THEIR ATTORNEYS Feb. 19, 1957 L. D. KILHEFFER ET AL 2,781,847

SELECTIVELY PROGRAMMED PERFORATING APPARATUS

Filed Oct. 9, 1953 7 Sheets-Sheet 7

INVENTORS
LAWRENCE D. KILHEFFER
JAMES L. HAGEMEYER
BY Earl Benst
Louis A Kline
THEIR ATTORNEYS 2,781,847

SELECTIVELY PROGRAMMED PERFORATING APPARATUS

Lawrence D. Kilheffer and James L. Hagemeyer, Dayton, Ohio, assignors to The National Cash Register Company, Dayton, Ohio, a corporation of Maryland Application October 9, 1953, Serial No. 385,196

15 Claims. (Cl. 164—113)

This invention relates to a tape-perforating apparatus and in particular to an apparatus containing a plurality of differentially-positionable switches which can be set in different operations of the apparatus to represent data which may have different significance and containing variable control means controlled according to the significance of the data for programming the punching operation to control the punching apparatus from desired ones of the switches and in preselected sequences according to the significance of the data being perforated.

In order to explain the invention more clearly, it will be explained in connection with the step-by-step sequential punching of the data on a tape under control of a cash register; however, it will be obvious that the invention is not limited to the use of a cash register for setting up the data, and that accounting machines and other apparatus for setting data on differentially-controllable switches may be used equally well. The cash register which is being used to explain the invention contains a plurality of rows of keys which are settable in different operations of the cash register according to the data to be recorded, which data may have different significance in the different operations of the cash register, and contains a row of transaction keys which can be set according to the significance of the data being entered in the cash register and recorded on the tape for the particular cash register operation.

In a typical operation of the cash register in registering a sale, the clerk will set up data on the proper rows of keys of the cash register, will operate the proper transaction key of the cash register according to the significance of the data, and will operate the motor bar to initiate an operation of the cash register to enter this data in the cash register. Switches will be differentially set in the cash register according to the data set up in the various rows of keys, and the program control means will be controlled according to the significance of the data set up on the transaction keys to control the punching apparatus from predetermined ones of the switches in sequence.

The program control means will be variably controlled under control of the transaction bank of keys to produce different punching programs by causing the punching operation to take place under control of different ones of the differentially-settable switches in various predetermined sequences. The program control means can also cause control symbols to be punched automatically after the punching of data under control of the settable switches when data having certain significance is being recorded on the tape.

Cash registers and accounting machines have been used in the past to control the punching of data entered therein, but in each instance the punching program was fixed and was the same for each operation. In none of the prior devices was there any variable punching program control means which could be controlled from the register according to the significance of the data being punched and which could control from which switches the punching apparatus would be controlled and also in which sequence the switches would be used to control the punching apparatus in punching operations for recording data having different significance.

This variable control of the punching apparatus by the switches on the cash register, as controlled by the program control means, enables a great degree of flexibility to be obtained in the control and arrangement of punched data on the tape and also eliminates unnecessary punching operations in those types of operations in which the data never utilizes the full capacity of the cash register, by enabling shorter punching sequences to be programmed in those types of operations.

It is an object of the invention to provide an apparatus for punching data of variable significance on a tape with controls for varying the punching sequence in accordance with the significance of the data being punched.

A further object of the invention is to provide an apparatus in which a set of switches may be set in different operations of the apparatus to represent data of different significance and can control a step-by-step operating punching apparatus to record this data, and in which program control means are controlled by certain of the switches on which the data is set, according to the significance of the data, to select which ones of the switches will be used to control the punching apparatus and to control the sequence in which they will be used, the number and/or sequence of the switches used varying with the punching of data of different significance as desired.

A further object of the invention is to provide a program control means for causing the sequential operation of a punching apparatus under control of switches on which data having different significance can be set, the program control means containing a plurality of portions which can be selectively rendered effective according to the significance of the data to be punched and each portion causing a different predetermined number of switches to be effective in a predetermined sequence to control the punching apparatus.

With these and incidental objects in view, the invention includes certain novel features of construction and combinations of parts, a preferred form or embodiment of which is hereinafter described with reference to the drawings which accompany and form a part of this specification.

In the drawings:

Fig. 1 shows a cash-register-operated switch for initiating punching operations to punch data automatically in a tape.

Fig. 2 shows a layout of the cash register keyboard.

Fig. 3 is a diagram showing the various punching programs according to the significance of the data being punched.

Fig. 4 is a portion of a punched tape showing the code by which data is punched in the tape.

Fig. 5 is a front elevation of the bracket for supporting the data switches and showing the switches mounted therein.

Figs. 6 and 7 show the one type of data switches.

Fig. 8 shows another type of data switch.

Fig. 9 shows the control slide and a control switch controlled thereby.

Figure 14A:
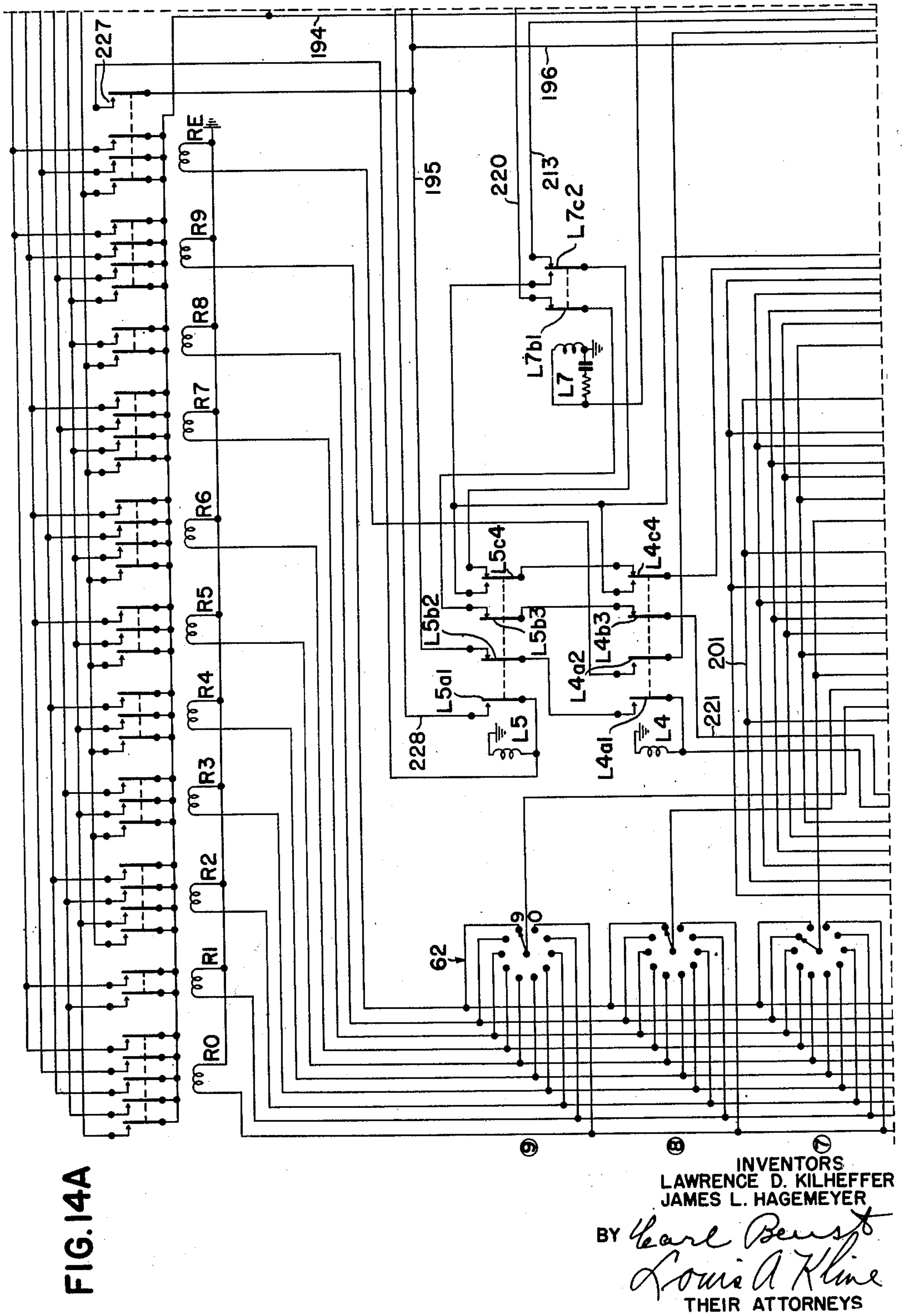
Figs. 14A, 14B, and 14C are to be arranged.
Figure 14B:
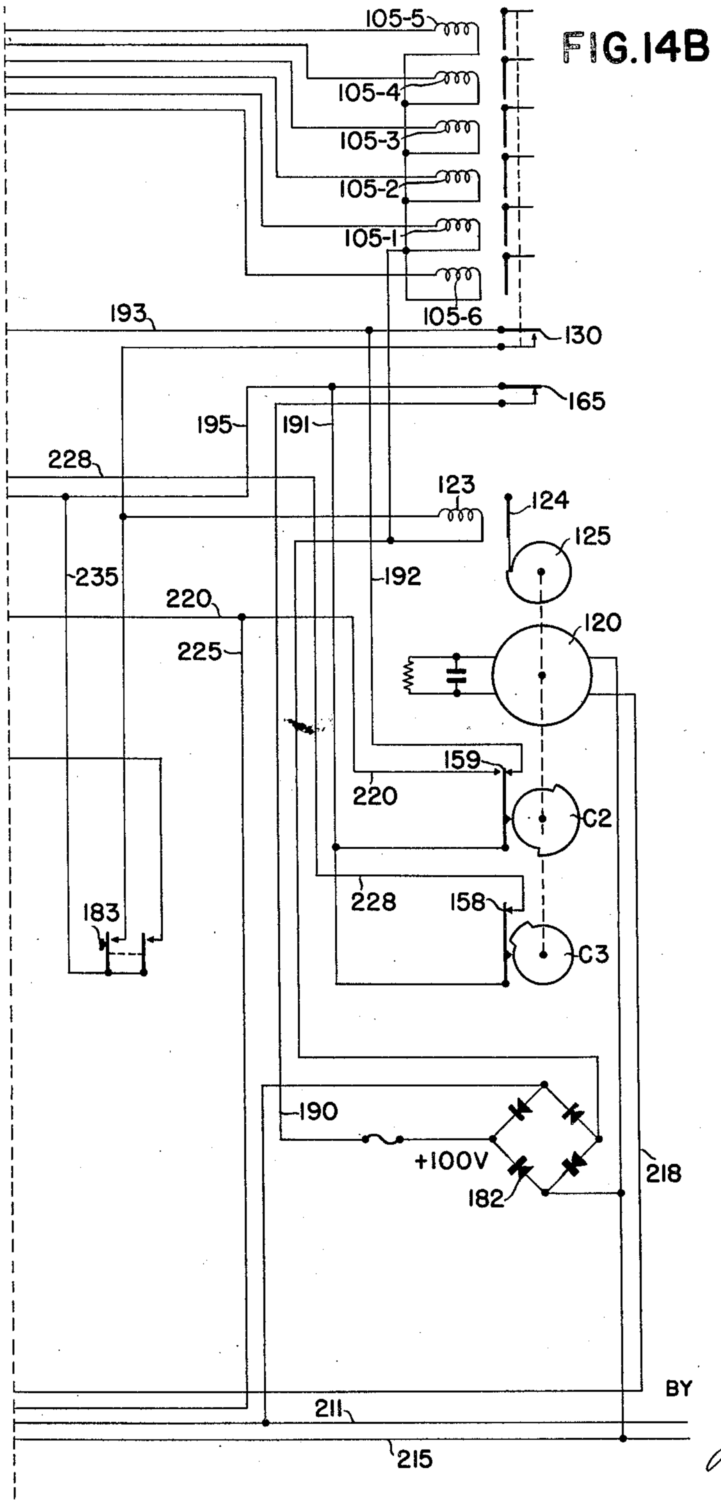
Figure 14:
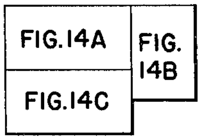
Fig. 14 is a diagram showing how
Figure 14C:
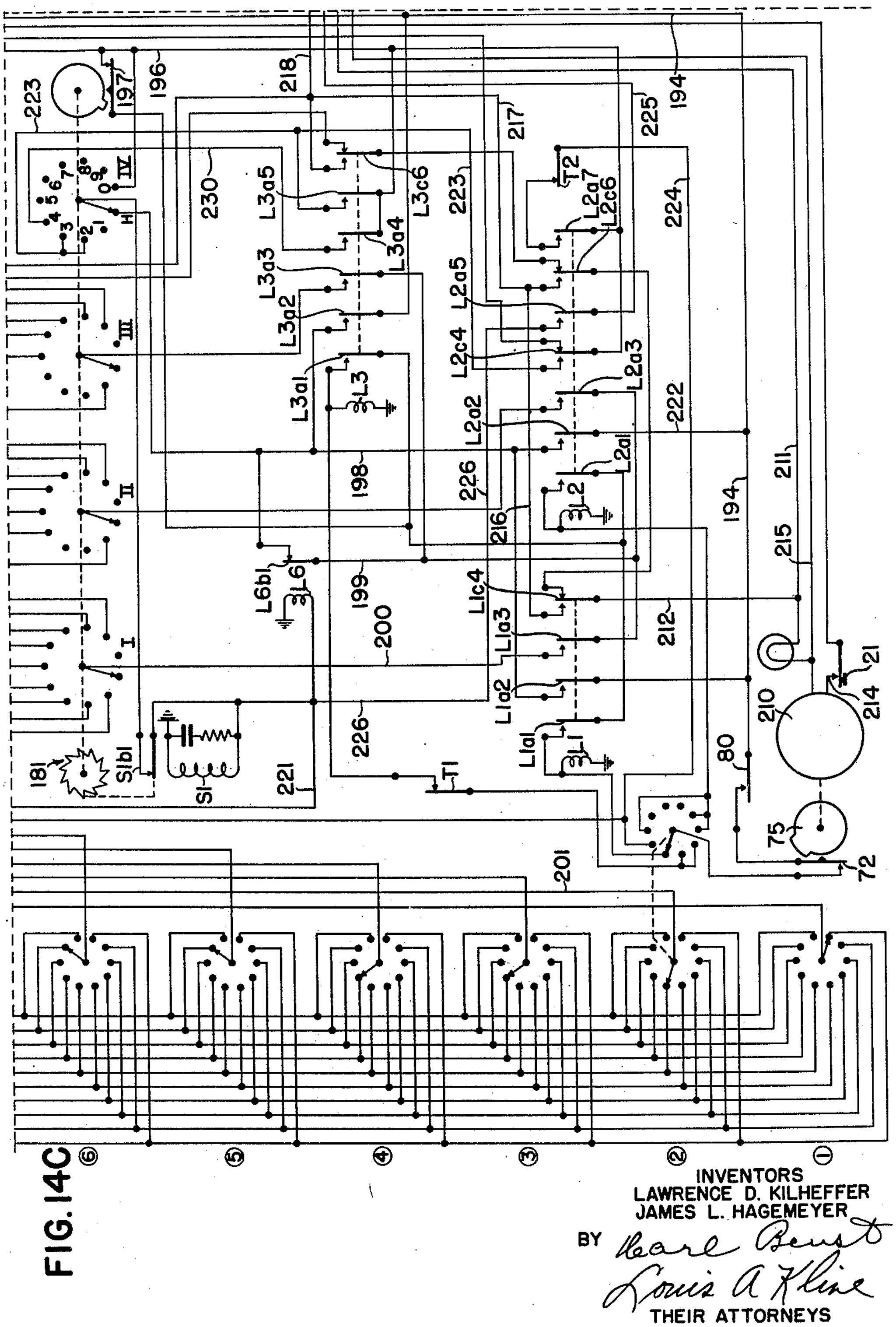

Figs. 14A, 14B, and 14C together show the circuit diagram by which the operations of the apparatus are coordinated.

In the embodiment of the invention which will be described, a cash register of the general type shown in the United States Patent No. 2,443,652, which issued September 28, 1948, to Edward J. Carey et al., and shown in the United States patent application Serial No. 255,870, which was filed November 10, 1951, by Frank R. Werner et al. and which issued as Patent No. 2,722,887 on November 8, 1955, and application Serial No. 306,762, which was filed August 28, 1952, by Frank R. Werner et al., and which issued as Patent No. 2,710,576 on June 14, 1955, has been chosen as the machine on which data is set up and which controls the punching apparatus according to the data and its significance. Only so much of the cash register will be shown as is necessary for an understanding of the invention, and reference may be had to the above patents for further details of the cash register, if desired.

As shown in Fig. 2, which is a layout of the cash register keyboard, the cash register is provided with the usual control slide 20, by which the proprietor can control the operating condition of the register; is provided with nine rows of keys on which data may be set; is provided with a motor bar 21 for initiating operations of the cash register; and is provided with the usual key release lever 22 for releasing any depressed key on the keyboard. In order to identify the various rows of keys, they have been numbered in Fig. 2 from 1 to 9, beginning at the right of the keyboard, rows 9 through 3 being amount rows; row 2 being a transaction row; and row 1 being a row of number keys which can be used as classification keys or can be used with the other rows of amount keys. Keys in rows 1 and 3 to 9 can be depressed to set up numerical data, while the keys in row 2, the transaction row, are depressed according to the significance of the data set up on the other rows of keys.

In the operation of setting up data in the apparatus, keys are depressed in the various rows, and the motor bar 21 is operated to initiate an operation of the cash register.

Figure 11:
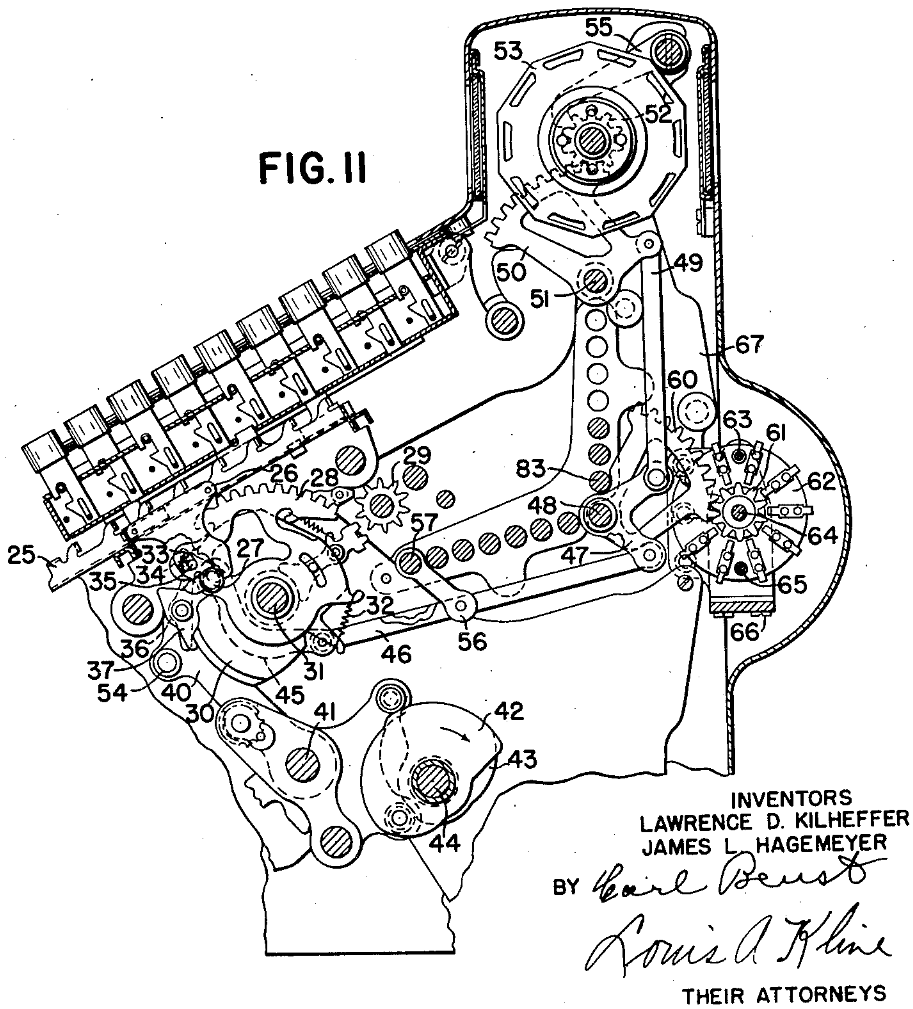
Fig. 11 is a typical section through one of the amount banks of the cash register.

The manner in which the keys control the differential operation of the machine to set data and other controls therein is fully set forth in the Carey et al. Patent No. 2,443,652. The operation will be explained briefly in connection with Fig. 11, which shows a section through the machine adjacent one of the amount rows.

A differential slide 25 is mounted immediately below each row of keys and is movable from a home position longitudinally to the right until one of the ears on the slide engages the depressed key in the row, the amount of movement which the slide can make being proportional to the value of the depressed key. A plate 26, secured to the slide 25, has, in its lower edge, a notch which engages a stud 27 on an actuator 28 of the differential mechanism and enables the slide 25 to control the extent of movement of the differential mechanism in accordance with the value of the depressed key.

The actuator 28 and a companion control plate 30 of the differential mechanism are rotatably mounted on a rod 31 and are urged in opposite directions by a spring 32. The actuator 28 and the plate 30 have oppositely-sloping slots 33 and 34, respectively, through which a stud 35 on a latch 36 extends to join the actuator 28, the plate 30, and the latch 36 for joint movement.

The latch 36 is pivotally mounted on a latch plate 37, which is also rotatable about the rod 31. Normally the latch is urged into driving relation with a driver (not shown) by the action of the slots 33 and 34 on the stud 35, which slots, due to the urging of the actuator 28 and the control plate 30 by the spring 32, force the stud 35 to the inner ends of the slots and thereby force the latch into driving engagement with the driver.

The driver is connected to an arm 40 and is rocked first clockwise then counter-clockwise about the rod 31 by the arm 40 as the arm is similarly rocked about a shaft 41 by a pair of cams 42 and 43, which are secured to the main shaft 44 of the register and are given a clockwise rotation in each case register operation.

During the initial operation of the register, the latch 36, being coupled to the driver, will move the actuator 28, the control plate 30, and the latch plate 38 of the differential mechanism clockwise and, through the stud 27 and the plate 26, will cause the differential slide 25 to be driven to the right.

As soon as an ear on the slide 25 engages a depressed key during the clockwise movement of the differential mechanism, further movement of the slide and the actuator 28 will be blocked, and continued movement of the latch by the driver will force the stud 35 outwardly along the slot 33 to disconnect the latch from the driver. The differential mechanism will remain in its set position throughout the remainder of the clockwise movement of the driver and until the driver picks up the latch plate 37 in the return movement of the driver and restores the differential mechanism to its starting position.

The actuator 28 is formed with a gear segment by which amounts corresponding to those set on the keyboard may be entered into the totalizer 29 of the register when certain transaction keys are depressed.

The differential mechanism is also used to set suitable indicating means, which shows the position to which the differential mechanism has been set. The indicator setting is accomplished by means of a linkage which includes a beam 45, pivoted at its upper end to the latch plate 37 and at its lower end to a link 46, which link is connected through a bell crank 47, pivoted on a rod 48, and a link 49 to a gear segment 50, which is pivoted on a rod 51 and engages a gear 52 on an indicator 53. During the clockwise movement of the differential mechanism, the upper end of the beam will be positioned therewith according to the key which is depressed, and, near the end of the clockwise movement, a roller 54 on the arm 40 will engage the beam 45 and force it into engagement with a hub on the rod 31. This will move the lower end of the beam and the linkage to position the indicator to a position corresponding to the position of the differential mechanism. During the clockwise movement of the driver, an aliner 55 is moved out of engagement with the gears, as 52, on the indicators and allows the indicators to be moved from a previously-set position to a new position, if necessary. The aliner 55 reengages the gears before the counter-clockwise movement of the driver begins and retains the indicators and their connected linkage in set position, the beam allowing the differential mechanism to be restored, while the indicator and associated linkage remain set.

There is one indicator-setting linkage for each differential mechanism, so that, for any operation of the machine, the indicators will be set according to the data on the keyboard. Each linkage is connected by an arm, as 56, to one of the shafts 57, by which the setting of the linkage can be carried across the machine to set various means to corresponding positions, there being one of the shafts, as 57, for each of the rows of keys on the keyboard. In the case of the transaction row, row 2, the indicator will indicate the significance of the data set up on the other rows of keys.

In order to enable the cash register to control the punching apparatus, the indicator-setting linkages are arranged to set switches according to the data set on the keyboard. Each of indicator-setting linkages related to one of the rows on the keyboard has a segment, as 60, connected thereto to be set thereby. These segments are pivoted on the rod 48 and cooperate with gears, as 61, on the rotors of switches, as 62, to enable the rotors to be set relatively to the contacts on the stators according to the data set on the keyboard.

The switches, as 62, are shown in Figs. 5, 6, 7, 8, and 11, as well as in Figs. 14A and 14C of the circuit diagram. As shown in Fig. 5, which is a view of the switches looking from the front of the machine, there is one switch for each of the rows 1 and 3 through 9 and two switches for the transaction row 2. The switches in rows 1 and 3 to 9 and one of the switches in row 2 are used to control the selection of the punches to record data on the tape, and the other switch in row 2 is used to control the operation of the program control means to control the number of switches and their sequence of operation according to the significance of the data when punching is to take place, as will be made more clear when the circuit diagram is explained. The switches are supported on three rods, 63, 64, and 65, mounted in a bracket 66, secured to the side frames 67 and 68 of the cash register.

The switches may be of two types, as shown in Figs. 6, 7, and 8. In certain instances, where parts of the cash register lie close to the switches, the type of switch shown in Figs. 6 and 7 is used. In this type of switch, two sets of five output contacts 70 are provided in slightly less than half the circumference on the stator, one set on each side of the stator, and the rotor 71 is provided with two wipers, which are located 180 degrees apart, one wiper cooperating with the output contacts of one set in five positions of the rotor, and the other wiper cooperating with the other set of contacts in the other five positions of the rotor. A common contact 72 is connected to both wipers.

In other instances, the type of switch shown in Fig. 8 is used. This is a simple ten-position wafer switch having ten output contacts 70 and a common input contact 71 on the stator and having a wiper on the rotor which can contact a different output contact in each of the positions to which the rotor can be set by the differential mechanism.

While these forms of switches have been found to be satisfactory, it is to be understood that they are not the only types that may be used, because other types which can provide similar switching may also be used.

The cash register has been provided with two additional control switches for controlling the punching apparatus.

A punching-operation-initiating switch 72 (Fig. 1) is mounted on a bracket 73, secured to the side frame 68 of the register, and is closed momentarily in each cash register operation by a lever 74, which is pivoted on the bracket 73 and is rocked counter-clockwise by a stud 75 in a plate 76, carried by the main shaft 44 of the cash register. This switch is closed near the end of the cash register operation, after the differentially-operable switches have been set according to the data on the keyboard, and initiates a punching operation, if one is required, according to the significance of the data set up.

The other switch, 80, is shown in Figs. 5 and 9. This switch is controlled from the control slide 20 and prevents punching in all positions of the slide except the "Register" position. As shown in Fig. 9, the control slide 20 has an extension 81, which is pivotally connected to a lever 82, secured to the cross shaft 83. The switch 80, which is a micro-switch, is secured on the bracket 66 (Figs. 5 and 9), and an arm 84 on the shaft 83 cooperates with the switch to close the switch only when the slide is in the "Register" position, as shown in Fig. 9. When the slide 20 is moved downwardly to its three other positions, the arm 84 is rocked away from the switch, allowing it to open. As will be explained in connection with the circuit diagram, switch 80 is in the punching-initiating circuit controlled by switch 72 and can control whether or not the punching operation will be initiated automatically near the end of an operation of the cash register.

It will be obvious that various types of punching apparatus can be controlled from the data-entering device, the cash register of the instant embodiment. The particular punching apparatus which will be used to explain the invention is of the type which operates step by step to perforate data serially in encoded form on a tape.

The punching apparatus (Figs. 12 and 13) includes eight punches 91 for punching rows of perforations across the tape. Only seven of the punches are required in the instant embodiment, one for punching the feed holes and six for punching the encoded data; however, if necessary, to encode data properly, the entire array may be used.

Fig. 4 shows a fragment of the tape in which a control symbol E and the digits 0 to 9 have been perforated in encoded form and in which a row of feed holes, as 90, have been punched.

The symbol E, or "eject" symbol, is used to indicate the end of a unit of information which is punched on the tape because in the instant embodiment the tape is primarily intended to be used to control a tape-to-card perforator, and the symbol will be used to provide a signal to cause a card to be ejected from the perforator after each unit of information has been punched. In those cases where the tape is to be used to control a typewriter or other apparatus, then some other suitable symbol may be used to produce the necessary signal to bring about an appropriate operation of the apparatus. The symbol and the numbers below the tape in Fig. 4 correspond to the data punched in the tape, and the numbers at the side of the tape identify the hole positions across the tape.

Each operation of the punching apparatus, whether punching data or merely feeding the tape, causes a feed hole to be perforated in the tape. These feed holes assist in feeding the tape through the punching apparatus and also through the sensing means which analyzes the tape.

The manner in which the punches are selected and operated will now be explained with reference to Fig. 13. Each punch 91 is pivotally connected to the right end of an actuating lever 92, which is pivoted intermediate its ends on a rod 93 in an actuating frame 94. The right ends of the levers 92 are guided in a comb plate 95 and are urged downwardly by springs 96.

The actuating frame 94 is pivoted at 97 and has rollers 98, which engage cams on a cam shaft 99 to rock the actuating frame 94 counter-clockwise from home position and then back to home position to raise and lower the rod 93, upon which the actuating levers 92 are pivoted.

The effectiveness of the actuating levers to operate the punches is controlled by a plurality of magnetically-controlled latches 100, which are pivoted on a rod 101, carried by a bracket 102, and which are urged clockwise by springs 103. The latches 100 are normally retained in their retracted, or non-latching, position, as shown in Fig. 13, by notches in the armatures 104 of punch-selecting magnets 105. When the latch is in its retracted position, it is out of engagement with the left end of the actuating lever 92, and this end is free to rise when the frame 94 raises the rod 93 and the actuating lever 92 pivots about its right end, the right end of the actuating lever being loaded by the spring 96. In this operation, the punch 91 will not be operated to punch the tape.

When a punch-selecting magnet 105 is energized, it moves its armature 104 away from the latch 100, freeing the latch 100 for clockwise movement by the spring 103 until the latching end of the latch engages over the left end of the actuating lever 92 to prevent the left end from rising when the actuating frame 94 raises the rod 93. Since the left end of the actuating lever is positively held by the latch against upward movement, the spring 96 will yield when the frame 94 is rocked, and the right end of the actuating lever 92 and the punch will be forced upwardly to perforate the tape. One or more punch-selecting magnets may be energized in each punching operation according to the encoding of the symbol or numeral being punched.

Each of the latches 100 has a forwardly-extending portion 106, with which a locking plate 107 can engage. The plate 107 is carried by a lever 108, which is pivoted on a rod 109 and is operated by a cam on the shaft 99 during the actual punching portion of the operation of the punch. When operated, the plate 107 engages the forwardly-extending portions 106 of the latches to lock those latches in normal position which have not been released by the punch selector magnets and lock those latches in moved position which have been released to select their related punches for operation.

The forwardly-extending portions 106 of those latches which have been released and have rocked downwardly will engage a restoring plate 110. The plate 110 is pivoted on the rod 101 and is rocked counter-clockwise by a cam-actuated arm 111 near the end of the punch operation. In order to insure that the latches will be properly restored to the control of the punch-selecting magnets 105, the restoring plate 110 provides a slight overthrow movement to the latches, and one of the latches engages a flange 112 on one arm of a bail 113 to rock the bail clockwise, which bail forces all the armatures away from the magnets and into engaging relation with the latches.

Since a feed hole is punched in each operation of the machine, regardless of the selection of punches by the magnets, the punch-actuating lever for the feed hole punch has its left end blocked against upward movement at all times. An arm 114, which is secured to the bracket 102, extends over the end of the actuating lever to cause the lever to force the punch upwardly in each operation of the punching apparatus.

The driving means for the punching apparatus will now be explained with reference to Figs. 10, 12, 13, and 14B. The punching apparatus is driven by a motor 120, to which power is applied continuously during the interval in which data punching is to take place. The motor 120 is connected by a belt to a driving disk 121 loose on a drive shaft 122, which is directly connected to the cam shaft 99. A clutch magnet 123 is provided and, when energized, will remove a block 124 from a notch in a clutch member 125 on the shaft 122 and will allow the shafts 122 and 99 to be driven by the motor.

The clutch magnet 123 is energized each time one of the punch-selecting latches 100 is released. A bail 126 (Fig. 13) extends across the latches 100 and is carried by a pair of arms 127 pivoted on the rod 101. One of the arms is formed with an extension 128, which is connected by a link 129 to operate a switch 130. When any one of the latches is rocked, upon its release by its related armature 104, it will rock the bail clockwise to close the switch 130. This will energize the clutch magnet 123 to render the clutch effective to connect the motor to the cam shaft 99 to drive it through one revolution, operating the selected punch or punches.

The tape which is to be punched extends from a supply reel 135 over a lower guide roller 136, then over an upper guide roller 137, and under a tape-feeding finger 138 to the punching station, from which it passes to the tape-feeding means, which feeds the punched tape from the punching apparatus.

Figure 10:
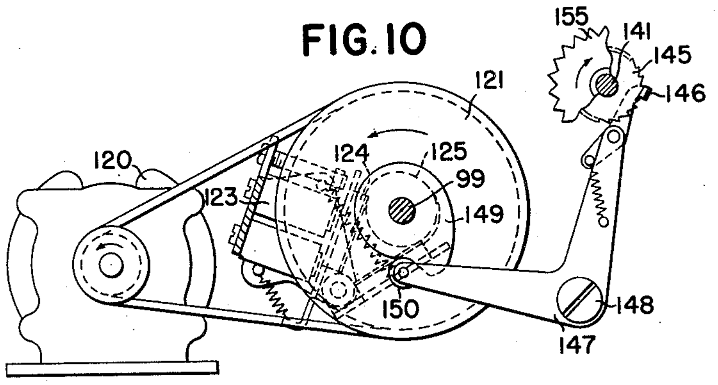
Fig. 10 is a view of the driving means of the punching apparatus and a tape-advancing means of the punching apparatus.
Figure 12:
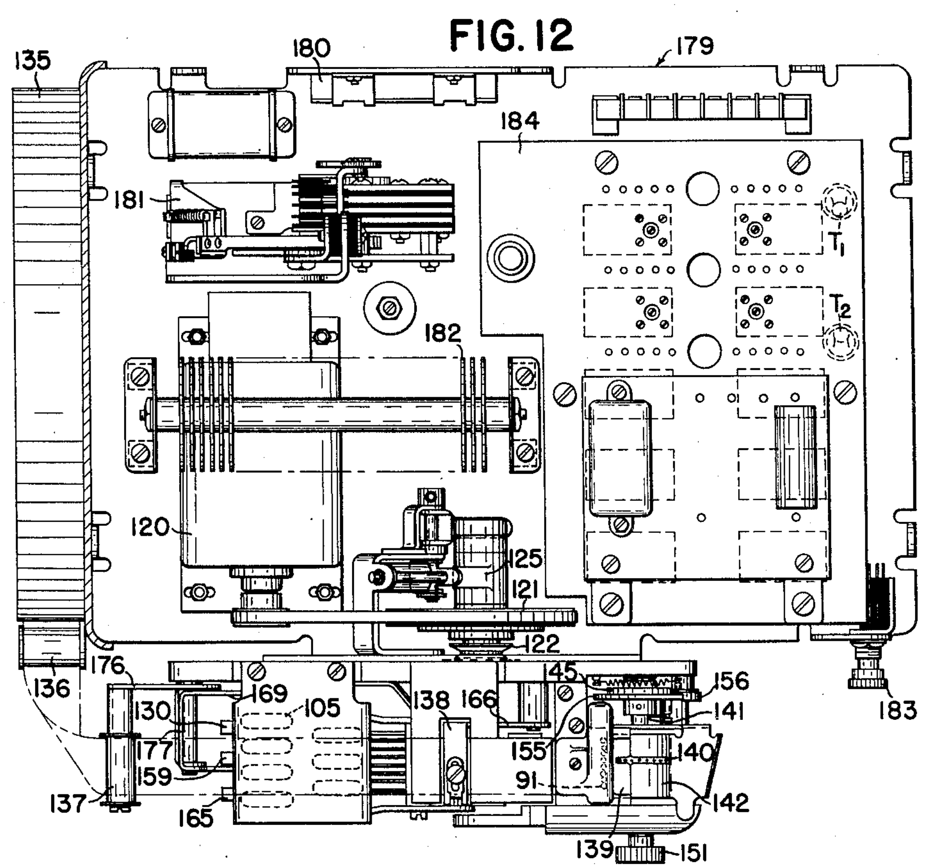
Fig. 12 is a top plan view of the tape-punching apparatus and the program control means for controlling the punching sequence.
Figure 13:
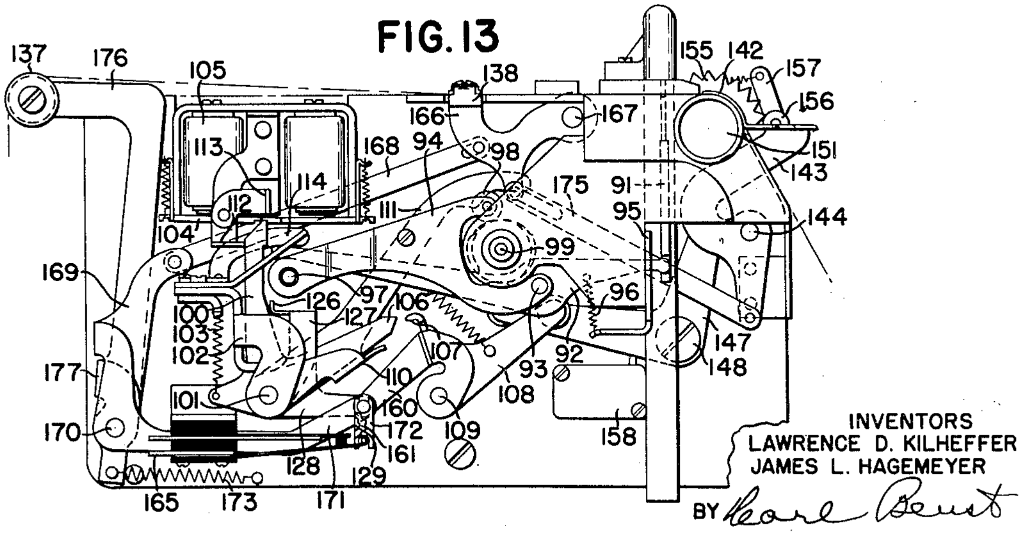
Fig. 13 is a side elevation of the tape-punching apparatus.

The tape-feeding means is shown in Figs. 10, 12, and 13. A feeding sprocket 139, having pins 140, which cooperate with the feed holes 90, is secured to a shaft 141, which is rotatable in the punching apparatus. A suitable pressure plate 142, secured to an arm 143, which is pivoted at 144, maintains the tape in driving engagement with the sprocket. The arm 143 can be rocked about its pivot to move the plate 142 away from the sprocket 139 when desired, as when tape is being put in the punching apparatus.

As shown in Fig. 10, the shaft 141 has secured thereto a ratchet 145, which is driven by a pawl 146, carried by one arm of a bell crank 147. The bell crank 147 is pivoted at 148 in the punching apparatus and is rocked counter-clockwise near the end of each punching operation by means of a cam 149, which cooperates with a roller 150 on the other arm of the bell crank.

A notched detent disk 155, which is also secured to the shaft 141, cooperates with a roller 156, carried by a lever 157 and spring-urged into engagement with the notches in the disk to insure that the tape will be advanced the proper amount to space the rows of perforations across the tape properly along the tape as punching progresses.

A knurled knob 151, secured to the shaft 141, enables the feeding sprocket 139 to be rotated manually without operating the punching apparatus.

The bell crank 147 also opens a switch 158 (Figs. 13 and 14B) each time it is rocked to advance the tape.

Another switch 159 (Figs. 12, 13, and 14B), of the break-and-make type, is operated by an arm 160 extending from the lever 108 and connected by a link 161 to the central blade of the switch. The switch remains in its operated position as long as the locking plate 107 engages the extensions 106.

A further switch 165 (Figs. 12, 13, and 14B) is in the power supply circuit for the punching apparatus and is controlled by the tape and portions of the tape-feeding means to prevent the operation of the punching apparatus if the tape or the tape-feeding means is in such a condition that proper punching cannot be had.

One of the controls for the switch 165 is from the feeler 138. The feeler 138 is carried by an arm 166, which is pivoted on a stud 167. With a supply of tape in the punching apparatus, the feeler 138 will be supported by the tape; but, as soon as the tape breaks or the end of the tape passes the feeler, the feeler will drop downwardly and rock the arm 166 counter-clockwise (Fig. 13) about the stud. A link 168 connects the arm 166 to an arm 169 of a yoke pivoted on a stud 170, the other arm 171 of which yoke is connected by a link 172 to the switch 165. A spring 173 normally urges the yoke counter-clockwise to maintain the switch 165 closed. When the arm 166 rocks counter-clockwise, it will pull the link to the right (Fig. 13) and will rock the yoke clockwise to open the switch.

The switch 165 is also opened when the pressure plate 142 is moved away from the sprocket 139. A link 175 is connected to the arm 143 and has a pin-and-slot connection with the arm 166, so that, whenever the arm 143 is rocked to move the pressure plate away from the sprocket, the link 175 will rock the arm 166 clockwise to raise the feeler 138 above the tape. The clockwise rocking of arm 166 will pull the link 168 to the right and rock the yoke to open the switch 165.

A further control of the switch 165 prevents punching if there is too much tension on the tape and improper punching would result. The roller 137 is supported at the upper end of a lever 176, which is pivoted on the stud 170 and is formed at its lower end with a yoke 177, which straddles the arm 169. If the feeding of the tape from the storage reel becomes blocked and the feeding of the tape by the tape-feed sprocket 139 continues, the tension on the tape will be increased and will shift the roller 137 to the right (Figs. 12 and 13), rocking the lever 176 clockwise. The yoke 177 will rock the arm 169 and its connected arm 171 clockwise to open the switch 165. As soon as the tension has been relieved, the spring 173 will return the arms 171, 169, and 176 to their normal position.

The circuits controlled by switches 130, 158, 159, and 165 will be fully described in connection with the circuit diagram.

The program control means, through which the cash register is enabled to control the punching apparatus to produce various punching sequences according to the significance of the data set on the cash register, will now be explained in connection with Figs. 3, 12, 14A, 14B, and 14C.

In the embodiment being described, certain punching sequences have been set up to illustrate this feature. The chart of Fig. 3 shows the various sequences which are utilized in this particular embodiment, and in Fig. 2 the brackets which embrace a transaction key and certain other rows on the keyboard indicate which rows will control the punching apparatus when the particular transaction key is depressed.

In "No sale" and "Sub-total" operations, the program control means is so controlled that no data is punched on the tape, because in the particularly embodiment it is not desired to have this information on the tape.

In "Number" operations, the "#" key in row 2 is depressed, and an identification number is set up on the keyboard. These numbers usually involve a large number of digits, and the program control means is so arranged that all the rows of keys can be effective to control the punching apparatus. In this sequence, the data for row 2, which is set according to significance of the data, will be punched ahead of the data according to the other rows, so that it will be sensed first to establish the significance of the other data. Since a "Number" operation merely sets up an identification number and does not set up a complete unit of information on the tape, it will be followed by another operation of the cash register, in which an amount related to this identification number is entered into the register; accordingly, an "eject" symbol will not be punched after the identification number in this sequence.

A "Merchandise" operation usually follows a "Number" operation in order that the amount of the sale of the article identified in the "Number" operation may be entered into the register. The "Merchandise" key in row 2 is depressed, and, since in the particular embodiment the amount will always be less than one thousand dollars, the punching sequence omits rows 8 and 9 and causes row 7 to follow row 2 in the punching sequence. The identification number and its related amount form a single unit of information; hence, at the end of the punching sequence in a "Merchandise" operation, an "eject" symbol, which indicates the end of a unit of information on the tape and provides a card eject signal when the tape is sensed, will be punched automatically.

"Received on account" and "Miscellaneous" operations, in which amounts are also entered in the cash register, utilize the same punching sequence as in the "Merchandise" operation; namely, a sequence with row 7 following row 2 and an "eject" symbol automatically following row 1.

In the instant embodiment, certain other types of data which are entered into the cash register involve only small amounts, such as federal tax and sales tax amounts. Furthermore, some transactions may involve federal tax alone or may also include sales tax, so that neither of these entries alone may be considered as a complete unit of information on the tape. Accordingly, in operations in which either the "Fed. tax" key or the "Sales tax" key is depressed, a short punching cycle is initiated, in which the punching from the 9, 8, and 7 rows of keys and the "eject" symbol are omitted.

In order to close the unit of information on the portion of the tape which includes tax data, the "Cash total" key is effective to cause only an "eject" symbol to be punched. The "Cash total" key is operated at the end of a transaction after the tax amounts have been entered, and its operation causes the total amount of the transaction to be printed and indicated, but, since the total is not to be punched on the tape, no punching will be done under control of the switches for rows 1 to 9, and only the "eject" symbol will be punched to provide the necessary card eject signal when the tape is sensed.

As in the "Number" punching sequence, the data for row 2 will be punched before that for the other rows in each of the several punching programs in order to establish the significance of the remaining data. The actual data which is punched for row 2 will be numerical, the same as for the other rows, but, since row 2 will always precede the other rows in the sequence, the apparatus which reads the tape can interpret the first row of punched data to establish the significance of the remaining data.

The program control means, therefore, is controlled from the cash register according to the significance of the data as determined by the particular key which is depressed in the transaction row, row 2, and will control the punching apparatus from only the required number of switches in the cash register and in the proper sequence.

The various components of the program control means and related controls are contained in a unit, shown generally at 179 in Fig. 12, which unit is separate from the cash register but is connected thereto by a cable. The unit is provided with a socket 180, into which a plug on the cable from the cash register can be inserted to connect the cash register and the punching apparatus for joint operation.

The unit 179 contains the driving motor 120 for the punching apparatus and also has the punching apparatus secured thereto. The unit also houses a four-level eleven-position stepping switch 181 and seven program control relays L1 to L7, which constitute the program control means; a rectifier 182, which provides D. C. operating voltages for the unit; eleven encoding relays R0 to R9 and RE for encoding the data to be punched; several switches, T1 and T2, for modifying certain controls by the program control means; and a manual tape feed button 183, for causing an operation of the punching apparatus to punch feed holes 90 and feed the tape from the apparatus without punching data, such a tape feed providing a leader for a tape on which the data is to be punched.

The encoding relays R0 to R9 and RE and the program control relays L1 to L7, together with their related capacitors and resistors, are mounted on several decks, as 184, which are located one above the other in the unit.

The circuits involved in controlling the punching apparatus from the cash register will now be described with reference to the circuit diagram in Figs. 14A, 14B, and 14C.

The differentially-settable switches 62 corresponding to the several rows of keys are shown to the left in Figs. 14A and 14C, where they are identified by the row numbers. Similar ones of the digit contacts in the several switches are connected together and to the corresponding decoding relays R0 to R9, which in turn close switches in proper combinations to selectively energize the required ones of the punch selector magnets 105 (Fig. 14B), which have been given further identifying numerals as 105–1, 105–2, etc., according to the code positions across the tape.

When operating potential is applied to the wiper of one of these differentially-settable switches 62, it will cause that encoding relay to be energized which corresponds to the setting of the switch, and this will cause the punching apparatus to punch, in encoded form, the data represented by the setting of the switch.

The punching program control means controls to which wipers of the switches 62, and in which sequence, operating power is applied, in the following manner.

As explained earlier, the stepping switch 181 is a four-level eleven-position switch. Of the four levels, level I can be rendered effective to control the punching sequence in "Number" operations; level II can be rendered effective to control the punching sequence in "Merchandise," "Received on account," and "Miscellaneous" operations; level III can be rendered effective to control the punching sequence in "Federal tax" and "State tax" operations; and level IV can be rendered effective, when levels II or III are used, to advance the stepping switch over the positions in which punching is omitted.

The program control relays L1 to L7 cooperate with the stepping switch 181 to control the selection of the punching sequence according to the significance of the data being punched.

The second switch which is set by the transaction row according to the significance of the data has its contacts connected to various ones of the program control relays; the "No sale" and "Sub-total" positions of the switch, which correspond to the "9" and "8" positions, respectively, of the switch, are not connected to any of the relays because, as seen in the chart of Fig. 3, no punching is desired in these operations; the "Mdse.," "Rec'd. on acct.," and "Misc." positions of the switch, which correspond to the "7," "2," and "1" positions, respectively, of the switch, are connected together and to the control relay L2; the "Cash total" contact, which corresponds to the "6" position, is connected to control relay L4; the "#" contact, which corresponds to the "5" position, is connected to control relay L1; and the "Fed. tax" and "State tax" contacts, which correspond to the "4" and "3" positions, respectively, of the switch, are connected to the control relay L3.

In the operation of the apparatus, it will be recalled, the data is set up on the keys of the cash register, and the motor bar 21 is depressed to initiate an operation of the cash register in which the switches will be set according to the data, and a switch 72 (Figs. 1 and 14C) is closed momentarily near the end of the cash register operation to initiate a punching operation.

When the switch 72 is closed, +100 volts from the rectifier 182 is supplied over conductor 190, the tape-controlled switch 165, conductor 191, switch 159 in its normal position, conductors 192, 193, and 194, and switch 80 to the wiper of the second switch of row 2, and thence over the wiper to the particular relay L1, L2, L3, or L4 as determined by the setting of the transaction switch 62.

If the transaction switch has been set to its "#," or "5," position, the closing of switch 72 will cause relay L1 to be energized and operate its contacts.

Contacts L1*a*1 will close a holding circuit for relay L1 to maintain the relay energized throughout the operation of the stepping switch, the holding circuit extending from the +100-volt conductor 190 and the tape-controlled switch 165, over conductors 195 and 196, over a normally-closed off-normal contact 197 (Fig. 14C), which is controlled by a cam on the stepping switch and is opened in the "0" position of the stepping switch as the switch returns to "home" position.

Contacts L1*a*2 close a circuit from the +100-volt conductor 194 over conductor 198 to the "home" contact in level IV of the stepping switch 181 and then over interrupter contacts S1*b*1 and the winding of the stepping magnet S1 and relay L6 in parallel. This circuit initiates the operation of the stepping switch by causing the stepping switch to step from its normal, or "home," position to the first, or "1," position. Relay L6 is operated in each operation of the stepping magnet to provide additional controls, which are coordinated with the operation of the stepping switch.

The above circuit, which is completed over contacts L1*a*2 to conductor 198, extends also over the normally-closed contacts L6*b*1, conductor 199, contacts L1*a*3, and conductor 200 to the wiper of level I of the stepping switch 181. When the wiper moves to the "1" position of the stepping switch, the circuit extends over conductor 201 to the wiper of the other switch of the transaction row, row 2, and then to the encoding relay, R5, since the switch is in its "5" position in a "Number" operation.

The encoding relay R5 closes contacts to energize punch-selecting magnets 105–1, 105–4, and 105–6.

Contacts L6*b*1 open each time the stepping switch operates and interrupt the circuit to the encoding relays to insure that they will be released before the stepping switch moves to a new position.

Contacts L1*c*4 are in an interlocking circuit by which A. C. power is supplied to either the cash register motor 210 or the motor 120 which drives the punching apparatus. The interlocking circuit extends from one of the A. C. supply conductors, 211, over conductor 212, then over contacts L1*c*4, L2*c*6, L3*c*6, L4*c*4, L5*c*4, and L7*c*2 in series to conductor 213, which extends over the motor-bar-controlled switch 214 to the motor, which is also connected to the other A. C. supply conductor 215. With all the relays deenergized, the circuit is so controlled as to allow the cash register to be operated when its motor bar 21 is depressed.

When relay L1 has been energized, its normally closed contact at L1*c*4 is opened to interrupt the above series circuit to the cash register motor 210, and its normally open contact at L1*c*4 is closed to connect conductor 212 to conductor 216 and thence over conductors 217 and 218 to the driving motor 120 of the punching apparatus, which motor is connected to the other A. C. supply conductor 215. The motor 120 will operate until the punching sequence has been completed.

Since the motor 120 begins to operate as soon as relay L1 is energized, it will be operating when the circuit over the wiper of level I of the stepping switch causes the selective energization of the punch release magnets 105–1 to 105–6 to release the punch-selecting latches 100. As explained earlier, the released latch or latches 100 will cause the contact 130 to close to energize the clutch trip magnet 123 to cause punching to take place.

When the cam shaft 99 has made about a quarter of a revolution, the cam thereon will move the locking plate 107 to engage the latches and also will operate the switch 159 to remove power from conductor 194 and apply it to a circuit for advancing the stepping switch, the circuit extending from the rectifier 182 over conductor 190, switch 165, conductor 191, switch 159 in its moved position, conductor 220, contacts L7*b*1, L5*b*3, and L4*b*3 in series, and conductor 221 to the stepping magnet S1 and the relay L6 to energize the magnet to prepare the stepping switch to be advanced and to operate the relay to interrupt the circuit over contacts L1*a*3 and the wiper to release the encoding relay R5 and the punch selector magnets.

After punching has taken place, and when the locking plate 107 is shifted from engagement with the latches 106, the contact 159 is returned to its normal, unoperated, condition to restore power to conductor 194 and remove power from conductor 220, which allows the stepping switch to move the wiper to the "2" position of the stepping switch and allows relay L6 to restore the circuit to the wiper of the stepping switch. In this position of the wiper of the stepping switch, it supplies operating power to the wiper of the switch 62 for the "9" row on the keyboard to cause the encoding relay R0 to R9 corresponding to the setting of this switch to be energized, which relay in turn energizes the required punch selector magnets to release the punch selector latches and trip the clutch in the punching apparatus to cause the data to be punched. During this operation of this punching apparatus, switch 159 is again operated to cause the stepping switch to advance its wiper to the third contact to cause punching of data under control of the switch 62 for row 8.

As punching progresses, the wiper engages the successive contacts in level I and causes punching according to the setting of the switches 62 for rows 7, 6, 5, 4, 3, and 1, in order. During the punching of data according to row 1, the stepping switch will be stepped to its "0" position, in which position no controls are obtained from levels I, II, or III, but in level IV the wiper connects the +100-volt conductor 196 to the stepping magnet S1 over the self-interrupting switch S1*b*1 and causes an operation of the stepping switch to move it to its "home" position.

When in its "0" position, the stepping switch will also operate its "Off-normal" switch 197 to open the holding circuit for relay L1, releasing this relay to terminate the punching sequence and allowing its contacts L1c4 to disconnect operating power from the motor 120 in the punching apparatus and re-apply the power to the cash register motor 210.

In the "Number" operation, therefore, the punching apparatus will be controlled by the switches 62 for all the rows of keys on the keyboard and in a sequence which begins with the switch for row "2" followed by the switches for rows "9," "8," "7," "6," "5," "4," "3," and "1," in that order.

The same punching sequence prevails in each of the "Merchandise," "Received on account," and "Miscellaneous" operations of the cash register, and the program control relay L2, which is connected to contacts "1," "2," and "7" of the transaction switch, will be energized when switch 72 is closed near the end of the cash register operation.

Certain of the contacts of program control relay L2 exert controls similar to those exerted by relay L1.

Contacts L2a1 close a holding circuit which extends over the "Off-normal" switch 197 of the stepping switch.

Contacts L2a2 close a circuit from the +100-volt conductor 194 over conductor 222 to the conductor 198, which extends to the "home" contact in level IV of the stepping switch, and thence over the switch S1b1 to the stepping magnet S1 to cause the stepping switch to be moved to its first position.

Contacts L2a3 connect conductor 199 to the wiper of level II to supply operating potential to this wiper.

Contacts L2c6 interrupt the power supply to the cash register motor 210 and connect power to the motor 120 in the punching apparatus.

In addition to these controls, the program control relay L2 provides further controls, which are made necessary by the difference in the punching sequence.

By referring to level II of the stepping switch, it will be seen that no connections are made to this level in positions 2 and 3, position 1 being connected to the switch 62 for row 2, and position 4 being connected to the switch for row 7, which is the next row to control the punching apparatus in this sequence. Since there will be no punching in positions 2 and 3 of the stepping switch, provision must be made to step the switch through these positions. Contacts L2c4, when operated, connect the +100-volt conductor 196 to conductor 223, which extends to the contacts in the 2 and 3 positions in level IV and supplies operating potential over the wiper of this level of the stepping switch and the self-interrupting switch S1b1 to the stepping magnet to cause the stepping switch to step through these positions.

In addition to controlling the punching apparatus according to the required rows of the keyboard, this sequence requires the punching of the "eject" signal at the end of the sequence. Contacts L2a7 close a circuit from the +100-volt conductor 196, over the switch T2 and conductor 224 to the relay L4, which will cause the "eject" symbol to be punched. Switch T2 is closed when the "eject" symbol is to follow the data set up on the keyboard, but, if it is desired to eliminate this symbol from the punching of this data, then the switch can be opened, and relay L4 will not be energized from L2.

When control relay L4 is energized, it interrupts at L4b3, the operating circuit by which the stepping switch was advanced as punching progressed, so an alternate operating circuit is provided over contacts L2a5, the circuit extending from conductor 220 over conductor 225, switch L2a5, and conductor 226 to the stepping magnet S1. The stepping magnet will be energized over this circuit each time the switch 159 is operated in a punching operation.

In this punching sequence, data according to row 2 will be punched in the 1 position of the stepping switch, and no data will be punched in positions 2 and 3, but the switch will be advanced automatically through these positions under control of level IV, and data according to rows 7, 6, 5, 4, 3, and 1 will be punched automatically as the switch moves through positions 4 to 9. The stepping switch will be returned to "home" position in the manner previously explained and, as it passes through 0 position, will open switch 197 to break the holding circircuit to relay L2.

The controls exerted by relay L4 to bring about punching of the "eject" symbol will now be explained.

When relay L4 was energized by the closing of contacts L2a7, it completed a holding circuit for itself over contacts L4a1 and L5b2 to conductor 195, which maintains relay L4 energized until relay L5 is energized.

Contacts L4a2 close in a circuit from the encoding relay RE, over contacts L4a2 to contacts L2c4, which interrupt the circuit due to the energization of L2. As soon as relay L2 is deenergized and contacts L2c4 return to their normal condition, they connect the +100-volt conductor 196 to the circuit and cause the encoding relay RE to be energized.

Contacts L4b3 open the stepping-switch-operating circuit, and contacts L4c4 open the operating circuit to the cash register motor 210 and close the operating circuit to the motor 120 is the punching apparatus.

Energization of the encoding relay RE causes circuits to be closed to the proper punch-selecting magnets 105 to trip the punch-selecting latches, which render the clutch effective to cause a punching operation. Relay RE also closes contacts 227, which energize relay L5.

Contacts L5a1 close a holding circuit for relay L5, which extends from conductor 191 over contact 158 and conductor 228 and maintains relay L5 energized until near the end of the punching operation.

Contacts L5b2 open the holding circuit to relay L4, and contacts L5b3 open the circuit from the punching apparatus to the stepping magnet.

Contacts L5c4 open the cash register motor circuit and close the circuit to the motor in the punching apparatus to insure that the drive will be provided for the punching of the "eject" symbol.

When control relay L5 is released, the punching of this sequence has been completed. The release of relay L5 after relays L2 and L4 have been released restores the cash register motor circuit to render the cash register operable to receive further data.

In both "Federal tax" and "State tax" operations of the cash register, the same punching sequence takes place. This sequence is similar to the "Number" sequence previously described but provides an abbreviated punching sequence which utilizes the smaller number of switches 62 in the control of the punching apparatus.

If the transaction switch is set in its 4, or "Federal tax," position, or its 3, or "State tax," position, closing of the switch 72 will cause relay L3 to be energized over a circuit which includes the switch T1, which may be opened to disable the relay if tax punching sequences are to be eliminated. As in the case with relays L1 and L2, control relay L3 closes a holding circuit for itself over contacts L3a1 and the "Off-normal" switch 197 and remains energized until the switch 197 is opened near the end of the operation of the stepping switch.

Contacts L3a2 connect conductor 194 to conductor 198, which extends to the "home" position in level IV and over the wiper and self-interrupting contacts S1b1 to the stepping magnet S1 to cause the stepping switch to step from its "home" position to its 1 position.

Contacts L3a3 connect conductor 199 to the wiper of level III. In this level, the 1 contact is connected to the wiper of the switch in row 2; the 2, 3, and 4 contacts are not connected to the wiper of any of the switches 62; and the 5 through 9 contacts are connected, respectively, to the wipers for the switches related to rows 6, 5, 4, 3, and 1.

Since punching of data in rows 9, 8, and 7 is omitted in this punching sequence and the 2, 3, and 4 contacts in level III are not connected to any of the switches 62, provision is made to step the stepping switch through these positions automatically. Contacts L3*a*5 connect conductor 196 to conductor 223, which extends to contacts 2 and 3 in level IV and causes the stepping switch to step through these positions automatically, as has been explained, and contacts L3*a*4 connect conductor 196 over conductor 230 to contact 4 of level IV to step the switch automatically through this position.

The remaining contacts L3*c*6 are in the motor interlock circuit. Energization of relay L3 causes contacts L3*c*6 to open the circuit to the cash register motor and to close the circuit to the motor in the punching apparatus.

In this punching sequence, therefore, data according to rows 2, 6, 5, 4, 3, and 1 will be punched in that sequence, omitting the data for rows 9, 8, and 7 and the "eject" symbol. By thus omitting a punching operation for each of these rows, the punching time will be shortened, and unnecessary punching will be eliminated.

The remaining punching sequence of those shown in Fig. 3 is that for "Cash total" operations, in which only the "eject" symbol will be punched. With the switch 62 for row 2 in its 6 position, relay L4 will be energized when switch 72 is closed near the end of the cash register operation.

The controls exerted by relay L4 are substantially the same as those in the "Merchandise," "Received on account," and "Miscellaneous" sequence, explained earlier.

Contacts L4*a*1 close a holding circuit for relay L4 over contacts L5*b*2 to conductor 195 to maintain relay L4 energized until relay L5 is energized.

Contacts L4*a*2 close a circuit to the encoding relay RE for the "eject" symbol, which circuit will be completed as soon as relay L4 is energized because relay L2 is deenergized at this time.

Contacts L4*b*3 interrupt the circuit to the stepping magnet S1, over which the punching apparatus advances the stepping switch, and prevents the operation of the stepping switch from "home" position.

Contacts L4*c*4 open the cash register motor circuit and close the circuit to the motor 120 in the punching apparatus.

As soon as the encoding relay RE is energized, it will energize the proper punch-selecting magnets to release their related latches, which in turn cause the clutch in the punching apparatus to be tripped and power to be applied to the punch.

Encoding relay RE also closes contact 227 to energize relay L5. Relay L5 opens, at contacts L5*b*2, the holding circuit to relay L4 and closes, at contact L5*a*1, a holding circuit for itself over contacts 158. Relay L5, at L5*b*3, retains the circuit from contact 159 to the stepping magnet open until contact 159 has returned to its normal position, to prevent the operation of the punching apparatus from causing an operation of the stepping switch; and, at L5*c*4, relay L5 opens the cash register motor circuit and closes the circuit to the motor of the punching apparatus to insure that the punching apparatus drive will be maintained until the "eject" symbol has been punched.

Near the end of the punching operation, after switch 159 has returned to its unoperated condition, switch 158 opens the holding circuit for relay L5, releasing this relay to restore the stepping of the stepping switch to the control of the punching apparatus and to restore the operating circuit for the cash register motor.

In this particular operation, therefore, in which only the "eject" symbol is to be punched, an extremely short punching operation takes place, and the program control means are restored to normal, and the cash register is made ready for further operation as soon as the single punching operation has taken place.

The remaining program control relay, relay L7, is utilized in those punching operations which take place when the manual tape feed button 183 is operated. The button 183 closes two contacts; one contact connects the +100-volt conductor 235 to the clutch 123 to trip the clutch, and the other contact connects conductor 235 to relay L7 to energize this relay.

Relay L7, when energized, interrupts, at L7*b*1, the circuit from the punching apparatus to the stepping magnet S1 to prevent stepping of the stepping switch during these punching operations and, at L7*c*2, interrupts the cash register motor circuit and closes the circuit to the motor of the punching apparatus. As long as the button 183 is operated, feed holes 90 will be punched, and the tape will be fed through the punching apparatus. This operation is of particular importance in preparing leaders on tapes by which they may be started in tape readers.

It is obvious that the invention is not limited to the particular embodiment which has been used to illustrate it, because other forms of data entry means, such as adding machines, accounting machines, printing machines, or keyboards alone could be used to provide the differential control similar to that of switches 62, and other forms of punching apparatus of the step-by-step type could be used to perforate the tape.

Further, if it is desired to eliminate the encoding relays, then the data-representing switches 62 can be provided with a plurality of levels according to the code desired, and the encoding can be obtained by directly controlling the selective operation of the punch-selecting magnets 105 from the switches according to the desired patterns for the different settings of the switches.

It is also obvious that the program control means is very flexible and can readily be changed whenever a new program or punching sequence is desired and that as many programs can be provided as there are classifications merely by providing additional program control relays and by providing additional capacity for the stepping switch either through the provision of additional levels for the stepping switch or through the provision of several stepping switches which can be rendered selectively effective by the program control relays.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. In an apparatus of the class described, the combination of a data entry device including a plurality of switching means which are settable according to data to be punched, each setting of the switching means being capable of representing data of different significance, and including a further switching means which is settable along with the plurality of switching means to represent the significance of the data set on the plurality of switching means; punching apparatus of the step-by-step type for punching data under control of the plurality of switching means, one after another; variable program control means for coordinating the control of the punching apparatus by the plurality of switching means to provide a plurality of different pre-arranged individually selectable punching sequences according to the significance of the data, each sequence causing the punching apparatus to be controlled from certain preselected ones of the plurality of switching means in a certain order; and means to control the program control means from the further switching means in the entry device to select the particular one of the pre-arranged punching sequences according to the significance of the data to be punched.

2. In a device of the class described, a data entry apparatus including a plurality of devices settable according to data to be recorded, each setting of the devices being capable of representing data of different significance, and including settable means set along with the plurality of devices to represent the significance of the data set on the plurality of settable devices; recording apparatus of the step-by-step type for recording data under control of the settable devices one after another; and program control means controlled by the settable means to provide different recording sequences according to the significance of the data to be recorded, by operating to select which ones of the settable devices are to control the recording apparatus and the sequential order of their control according to the significance of the data being recorded.

3. In an apparatus of the class described, the combination of a data entry device including a plurality of switching means which are differentially settable according to data to be punched, each setting of the switching means being capable of representing data of different significance, and including a further switching means which is settable to represent the significance of the data set on the plurality of switching means; punching apparatus of the step-by-step type for punching data under control of the plurality of switching means, one after another; variable program control means for coordinating the control of the punching apparatus by the plurality of switching means to provide a plurality of different punching sequences, said program control means including a plurality of individually selectable portions, each portion causing a different punching sequence by causing a different predetermined number of the plurality of switching means to be effective in a predetermined sequence to control punching apparatus to cause the data to be punched; and means to enable the further switching means in the entry device to select the portion of the control means which will control the punching sequence according to the significance of the data to be punched.

4. In an apparatus of the class described, the combination of a plurality of switches which are settable according to data to be punched, each setting of the switches being capable of representing data of different significance; a further switch which is settable along with the plurality of switches in each data punching operation to represent the significance of the data set on the plurality of switches; punching apparatus of the step-by-step type for punching data under control of the plurality of switches, one after another; variable program control means for coordinating the control of the punching apparatus by the plurality of switches to provide a plurality of individually selectable different-length punching sequences, the program control means in each sequence causing the punching apparatus to be controlled sequentially from only those preselected ones of the plurality of switches which are necessary to punch data having particular significance and preventing the control of the punching apparatus from those switches which are not necessary to punch data having this particular significance; and means to control the program control means from the further switch to select the particular punching sequence of the required length according to the significance of the data to be punched.

5. In an apparatus of the class described, the combination of a data entry device including a plurality of switches which are differentially settable according to data to be punched, each setting of the switches being capable of representing data of different significance, and including a further switch which is differentially settable to represent the significance of the data set on the plurality of switches; means to cause the entry device to operate to set the switches therein according to the desired data and its significance; punching apparatus of the step-by-step type for punching data serially on a tape under control of the plurality of switches, one after another; variable program control means for coordinating the control of the punching apparatus by the plurality of switches to provide a plurality of different punching sequences, each sequence causing the punching apparatus to be controlled from certain preselected ones of the plurality of switches in a certain order; means to control the program control means from the further switch in the entry device to select the punching sequence according to the significance of the data to be punched; and means in the entry device and operated after the switches have been set, to initiate the operation of the punching apparatus under control of the program control means to cause the punching apparatus to operate according to the selected sequence to punch the data.

6. In an apparatus of the class described, the combination of a data entry device including a plurality of switches which are differentially settable according to data to be punched, each setting of the switches being capable of representing data of different significance, and including a further switch which is differentially settable to represent the significance of the data set on the plurality of switches; means to cause the entry device to operate to set the switches therein according to the desired data and its significance; punching apparatus of the step-by-step type for punching data serially on a tape under control of the plurality of switches, one after another; variable program control means for coordinating the control of the punching apparatus by the plurality of switches to provide a plurality of different punching sequences, each sequence causing the punching apparatus to be controlled from certain preselected ones of the plurality of switches in a certain order; means to control the program control means from the further switch in the entry device to select the punching sequence according to the significance of the data to be punched; means in the entry device and operated after the switches have been set, to initiate the operation of the punching apparatus under control of the program control means to cause the punching apparatus to operate according to the selected sequence to punch the data; and means in the program control means for controlling the operation of the entry device operating means to prevent a further operation of the entry device until the punching sequence has been completed.

7. In an apparatus of the class described, the combination of a data entry device including a plurality of switches which are settable according to data to be punched, each setting of the switches being capable of representing data of different significance, and including a further switch which is settable to represent the significance of the data set on the plurality of switches; punching apparatus of the step-by-step type for punching data under control of the plurality of switches, one after another; fixed data control means for controlling the punching apparatus to punch predetermined fixed data when desired; and variable program control means controlled by said further switch for coordinating the control of the punching apparatus by the plurality of switches to provide a plurality of different punching sequences according to the significance of the data, the different punching sequences causing different predetermined ones of said plurality of switches to be rendered effective in related predetermined sequences to control the punching apparatus and certain of said sequences including said fixed data, said program control means including a stepping switch which is advanced as punching progresses and contains a control portion for each possible punching sequence to selectively render the switches of the plurality of switches effective in the proper sequence as the stepping switch is advanced, and includes control relays selectively energized under control of said further switch according to the significance of the data to render the proper control portion of the stepping switch effective to produce the desired punching sequence and to render the fixed data control means effective if the fixed data is to be included in the punching sequence.

8. In an apparatus of the class described, the combination of a plurality of switches which are settable accordingto data to be punched, each setting of the switches being capable of representing data of different significance; a further switch which is settable to represent the significance of the data set on the plurality of switches; punching apparatus of the step-by-step type for punching data under control of the plurality of switches, one after another; and program control means variably controlled by the further switch for coordinating the control of the punching apparatus by the plurality of switches to provide a plurality of different punching sequences according to the different significance of the data, different predetermined ones of said plurality of switches being rendered effective in related predetermined sequences in different punching sequences to control the punching apparatus, said program control means including a stepping switch which is advanced as punching progresses and contains a control portion for each possible punching sequence to selectively render the switches of the plurality of switches effective to control the punching apparatus in the proper sequence as the stepping switch is advanced, and also including control relays which are selectively energized under control of said further switch according to the significance of the data to render the proper control portion of the stepping switch effective to produce the desired punching sequence.

9. In an apparatus of the class described, the combination of a data entry device including a plurality of switches which are settable according to data to be punched, each setting of the switches being capable of representing data of different significance, and including a further switch which is settable to represent the significance of the data set on the plurality of switches; punching apparatus of the step-by-step type for punching data under control of the plurality of switches, one after another; and variable program control means for coordinating the control of the punching apparatus by the plurality of switches to provide a plurality of different punching sequences, the different punching sequences causing different predetermined ones of said plurality of switches to be rendered effective in related predetermined sequences to control the punching apparatus, said program control means including a stepping switch which is advanced under control of the punching apparatus as punching progresses and contains a control portion for each possible punching sequence to selectively render the switches of the plurality of switches effective in the proper sequence as the stepping switch is advanced, includes auxiliary means to advance the stepping switch to compensate for the missing punching operations in those sequences in which all of the plurality of switches are not utilized to control the punching apparatus, and includes control relays selectively energized under control of said further switch according to the significance of the data to render the proper control portion of the stepping switch effective and also render the auxiliary means effective if necessary to produce the desired punching sequence.

10. In an apparatus of the class described, the combination of a plurality of switches which are settable according to data to be punched, each setting of the switches being capable of representing data of different significance; a further switch which is settable to represent the significance of the data set on the plurality of switches; punching apparatus of the step-by-step type for punching data under control of the plurality of switches, one after another; variable program control means for coordinating the control of the punching apparatus by the plurality of switches to provide a plurality of different-length punching sequences, said control means causing the punching apparatus to be controlled in the different-length sequences sequentially from different numbers of the plurality of switches which are necessary to produce the required length of punching sequence and preventing the control of the punching apparatus from the remaining switches which are not necessary in the punching sequence, said program control means containing a control portion for each of the plurality of punching sequences to select which switches will be utilized in the sequence and in what order they will be utilized and containing a plurality of relays which can be selectively energized to select which portion will control the punching apparatus; and means to selectively energize the relays in the program control means from the further switch to select the punching sequence according to the significance of the data to be punched.

11. In an apparatus of the class described, the combination of a plurality of switches which are settable according to data to be punched, each setting of the switches being capable of representing data of different significance; a further switch which is settable to represent the significance of the data set on the plurality of switches; punching apparatus of the step-by-step type for punching data under control of the plurality of switches, one after another; variable program control means for coordinating the control of the punching apparatus by the plurality of switches to provide a plurality of different-length punching sequencies, each sequence causing the punching apparatus to be controlled sequentially from only those preselected ones of the plurality of switches which are necessary to punch data having particular significance, said program control means including a stepping switch which is advanced as punching progresses and contains a control portion for each of the different-length punching sequences, each control portion supplying operating energy to the proper number of switches, one at a time in the proper sequence, as the stepping switch is advanced to cause the punching apparatus to be operated according to the related punching sequence, and also including control relays which can be selectively energized to control which control portion of the stepping switch will be effective as the switch is stepped during the punching operation; and means to selectively energize the relays of the program control means from the further switch to select the punching sequence according to the significance of the data to be punched.

12. In an apparatus of the class described, the combination of a data entry device including a plurality of switches which are settable according to data to be punched, each setting of the switches being capable of representing data of different significance and including a further switch which is settable to represent the significance of the data set on the plurality of switches; a fixed data control means for causing a predetermined symbol to be punched; punching apparatus of the step-by-step type for punching data under control of the plurality of switches, one after another, and, when required, under control of the fixed data control means; variable program control means for coordinating the control of the punching apparatus by the plurality of switches and by the fixed data control means to provide a plurality of different-length punching sequences, the different punching sequences causing different numbers of the plurality of switches to be utilized to control the punching apparatus and, in certain sequences, also utilizing the fixed data control means to control the punching apparatus, said program control means including a stepping switch which is advanced step by step through a fixed extent of movement for each sequence and contains a control portion for each possible sequence, each control portion applying operating potential only to those preselected ones of the plurality of switches, one after another, as the stepping switch is advanced, which are necessary in the punching sequence, and also includes control relays for the several sequences for selectively rendering the fixed data control means effective, if required, in a desired sequence and also rendering the proper control portion of the stepping switch effective according to the desired sequence; means to selectively energize the control relays of the program control means from the further switch in the entry device to select the punching sequence according to the significance of the data to be punched; means operated by the punching apparatus for advancing the stepping switch as punching progresses; and auxiliary means controlled by the control relays to advance the stepping switch to compensate for those missing punching operations in those shorter sequences in which all of the plurality of switches are not utilized to control the punching apparatus.

13. In an apparatus of the class described, the combination of a plurality of switches which are settable according to data to be punched, each setting of the switches being capable of representing data of different significance; a further switch which is settable to represent the significance of the data set on the plurality of switches; a fixed data control means for causing predetermined fixed data to be punched; punching apparatus of the step-by-step type for punching data under control of the plurality of switches, one after another, and, when required, by the fixed data control means; variable program control means for coordinating the control of the punching apparatus by the plurality of switches and, when required, by the fixed data control means to provide a plurality of different-length punching sequences, said control means causing the punching apparatus to be controlled in the different-length sequences sequentially from different numbers of the plurality of switches which are necessary to produce the required length of punching sequence and, when required, from the fixed data control means, said program control means containing a control portion for each of the plurality of punching sequences to select which switches will be utilized in the sequence and in what order they will be utilized and containing a plurality of relays which can be selectively energized to select which portion will control the punching apparatus; and means to selectively energize the fixed data control means or the relays in the program control means from the further switch to select the punching sequence according to the significance of the data to be punched.

14. In an apparatus of the class described, the combination of a data entry device including a plurality of switching means which are settable according to data to be punched, each setting of the switching means being capable of representing data of different significance, and including further switching means which is settable to represent the significance of the data set on the plurality of switching means; punching apparatus of the step-by-step type for punching data under control of the plurality of switching means, one after another; and program control means variably controlled by the further switching means for coordinating the control of the punching apparatus by the plurality of switching means to provide a plurality of different punching sequences according to the different significance of the data, predetermined ones of said plurality of switching means being rendered effective in predetermined sequences in different punching sequences to control the punching apparatus, said program control means including a stepping switch which is advanced as punching progresses and contains a control portion for each possible punching sequence to selectively render the desired ones of the switching means of the plurality of switching means effective to control the punching apparatus in the proper sequence as the stepping switch is advanced, and also including control circuits which are selectively energized under control of said further switching means according to the significance of the data to render the proper control portion of the stepping switch effective to produce the desired punching sequence.

15. In an apparatus of the class described, the combination of a data entry device including a plurality of switching means which are settable according to data to be punched, each setting of the switching means being capable of representing data of different significance and including a further switching means which is settable to represent the significance of the data set on the plurality of switching means; punching apparatus of the step-by-step type for punching data under control of the plurality of switching means, one after another; variable program control means for coordinating the control of the punching apparatus by the plurality of switching means to provide a plurality of different punching sequences, the different punching sequences causing different predetermined ones of said plurality of switching means to be rendered effective in related predetermined sequences to control the punching apparatus, said program control means including a stepping switch which is advanced to provide sequential controls in a punching sequence and contains a control portion for each possible punching sequence to selectively render the switching means of the plurality of switching means effective in the proper sequence as the stepping switch is advanced, and also including control circuits which are selectively energized under control of said further switching means according to the significance of the data, to render the proper control portion of the stepping switch effective to produce the required punching sequence; and means in the punching apparatus operable, as the punching apparatus punches data under control of one of said plurality of switching means, for causing the stepping switch to advance to render a further one of said plurality of switching means effective to control the punching apparatus as required by the particular punching sequence which is effective.

References Cited in the file of this patent

UNITED STATES PATENTS

| | | |
|---|---|---|
| Re. 21,133 | Lake | June 27, 1939 |
| 1,962,750 | Read | June 12, 1934 |
| 2,030,432 | Dickinson | Feb. 11, 1936 |
| 2,146,283 | Bryce | Feb. 7, 1939 |
| 2,272,448 | Van Pein | Feb. 10, 1942 |
| 2,306,894 | Nelson | Dec. 29, 1942 |
| 2,355,389 | Mills et al. | Aug. 8, 1944 |